United States Patent [19]

Milne

[11] 3,839,728

[45] Oct. 1, 1974

[54] METHOD OF GENERATING CONTROL TONES

[75] Inventor: John W. Milne, Ellicott City, Md.

[73] Assignee: The United States of America as represented by the Secretary of the Army, Washington, D.C.

[22] Filed: Feb. 9, 1973

[21] Appl. No.: 330,938

[52] U.S. Cl. .................................................. 360/26
[51] Int. Cl. ............................................ G11b 5/44
[58] Field of Search .............. 340/174.1 B, 174.1 H; 179/100.2 S, 100.2 MD

[56] References Cited

UNITED STATES PATENTS

| | | | |
|---|---|---|---|
| 2,842,756 | 8/1958 | Johnson | 340/174.1 B |
| 2,937,239 | 5/1960 | Garber, Jr. et al. | 340/174.1 B |
| 2,937,366 | 5/1960 | Sims, Jr. | 340/174.1 B |
| 3,566,382 | 2/1971 | Niquette | 340/174.1 B |
| 3,576,553 | 4/1971 | Herrich | 340/174.1 B |

*Primary Examiner*—Vincent P. Canney
*Attorney, Agent, or Firm*—John R. Utermohle; Thomas O. Maser

[57] ABSTRACT

A scheme by which control tones are derived for each data track on a tape. The concept involves using reference tones on both sides and the center of the tape. These tones are standard sine waves of some frequency A cos $\omega t$. There will be some phase difference between the edge tracks and the center tone track in the event of skew. One edge tone and the center tone are then added vectorily by a resistance adder, the number of resistors depending on the number of data tracks between the edge and center tones.

4 Claims, 4 Drawing Figures

METHOD OF GENERATING CONTROL TONES

BACKGROUND OF THE INVENTION

This invention relates generally to the art of multi-track magnetic tape recording, and more particularly to the generation of control tones for the correction of time base error introduced by skew. Basically, such errors arise due to the elasticity of magnetic recording tape and the resulting physical distortion due to drag from tape heads, unequal tension from tape drive mechanisms and similar causes.

The prior art teaches the use of reference tones for skew correction. See, for example, U.S. Pat. No. 2,937,239 to Garber, Jr. et al., granted May 17, 1960. The disadvantage of most such methods is that a mechanical correction for the entire tape is made, based usually upon the average error at the center. The results are decreasing accuracy as one moves toward the track at the outer edge of the tape and a relatively slow response to changes in the amount of skew. Time base error correction has also been made by recording a reference tone beside each data track on the tape. The tone could then be compared to an external standard, with appropriate correction being made accordingly; however, this highly accurate method of error correction has the disadvantage of being extremely inefficient because half of each tape is used in recording the reference tones, leaving only half the tape for data recording. It is desirable to have a correction scheme which uses few reference tones, yet corrects each individual data track according to its own error.

SUMMARY OF THE INVENTION

The present invention is based on the fact that skew is a predominantly linear function. That is, a track midway between the edges of a tape would have a skew-based time displacement of one half the relative time displacement between the two outermost tracks. Equal amplitude reference tones on the outermost tracks, if vector added with equal weighting, will therefore produce a tone having phase characteristics nearly identical to those of a reference tone recorded on the center track. Similarly, with appropriate weighting, a control tone may be simulated for all the data tracks within the outermost reference tone tracks.

In a preferred configuration, three reference tracks are placed upon a tape, one on each outermost track and one on the middle track. The tone recorded on these tracks may be a standard sine wave of some frequency $A \cos \omega t$. There will be some phase difference between each outermost track and the center tone track in the event of skew. The one outermost tone and the center tone are then added vectorially by a resistance adder, the number of resistors depending on the number of data tracks between the outermost and center tones. The output between each resistor carries a control tone containing the phase relationship for a particular data track; the output tone nearest the outermost tone representative of the phase of the first track, etc. Each of these control tones, together with its corresponding data track, is then sent to the error-compensation electronics of the type described herein below.

Accordingly, it is an object of this invention to provide a new and improved method of generating control tones.

Another object of this invention is to provide a method of efficiently generating control tones for the correction of time base errors introduced by skew.

Additionally, it is an object of this invention to generate such control tones by electrical rather than by mechanical means.

A still further object of this invention is to generate such control tones for each data track individually, based upon a measured phase difference between the reference tones recorded at the center and edges of the tape.

A method of generating a control tone for a data track located between an outermost track and a centrally disposed track of a multitrack magnetic recording tape, illustrating certain features of the invention may include: recording a first reference tone on the outermost track of the tape, recording a second reference tone on a centrally disposed track of the tape, vector adding the first and second reference tones through a resistor circuit and sampling the resistor circuit whereby the resultant control tone has a phase angle proportional to the relative phase angle between the first and second reference tones as the distance from the data track to the outermost track is proportional to the distance between the outermost and centrally disposed tracks.

A complete understanding of the invention may be obtained from the following detailed description of a method forming a specific embodiment thereof, when read in conjunction with the appended drawings in which:

DESCRIPTION OF THE PREFERRED EMBODIMENT

The present method is applicable whenever data is to be recorded and played back on a multitrack magnetic recording tape. It is common for such multitrack tape recorders to have pickup transducers contained in two separate head stacks, with each head stack operating on alternately spaced tracks. If, for example, one is using a 42-track tape of the type shown in FIG. 1, one head stack will probably contain the playback transducers for the even numbered tracks and the other head stack will probably contain playback transducers for the odd numbered tracks. Thus, it is necessary for control tones for odd and even tracks to be simulated separately. In the particular embodiment described herein, reference tones may be recorded on tracks 1, 21 and 41 to be used for simulation of control tones for the odd numbered data tracks. Similarly, reference tones may be recorded on tracks 2, 22 and 42 to be used for simulation of control tones on the even numbered data tracks. For purposes of this illustration, the reference tone recorded on tracks 1, 2, 41 and 42 will be referred to hereinafter as reference tone A, and the reference tone recorded on tracks 21 and 22 will be referred to hereinafter as reference tone B.

Figure 1:
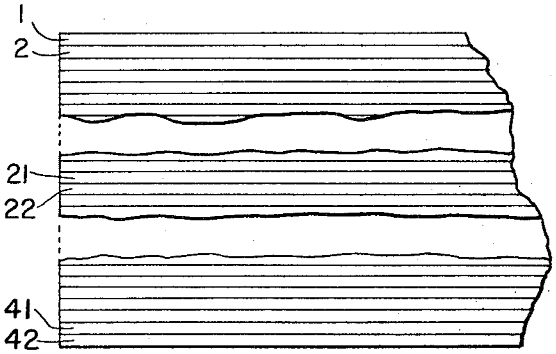
FIG. 1 illustrates a portion of magnetic recording tape divided into tracks upon which reference tones and data may be recorded.
Figure 2:
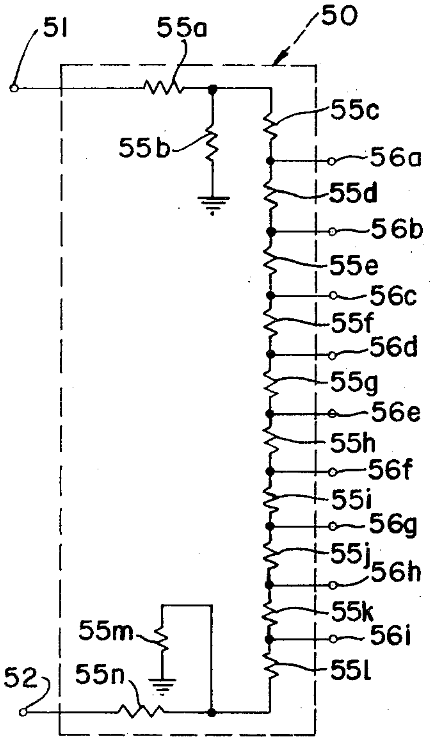
FIG. 2 is a schematic diagram for a vector adder circuit suitable for use in control tone simulation by the method of the present invention.

Referring to FIG. 2, a circuit 50 is shown with which control tones may be generated for a tape, such as the 42-track tape shown in FIG. 1, which has nine data tracks between reference tracks. In this particular embodiment, four such circuits are needed to simulate control tones for an entire tape. Specifically, one circuit would have connected to its inputs, the reference tones recorded on tracks 1 and 21 for the simulation of control tones for those data tracks, lying between tracks 1 and 21, having odd numbers. A second circuit, having as inputs the reference tones on tracks 2 and 22, would simulate control tones for those data tracks, lying between 2 and 22, having even numbers. In like manner, the third and fourth circuits would utilize the reference tones recorded on tracks 21, 22, 41 and 42 to simulate control tones for the odd and even numbered data tracks lying between reference tracks 21, 22, 41 and 42.

In operation, the reference tone A from one outermost track is connected to the circuit 50 at input 51, and the reference tone B from a centrally disposed track is connected at input 52. Completing the circuit is a vector adder comprising a chain of resistors 55, with the number of resistors generally determined by the number of data tracks disposed between the reference tones. Between the resistors 55 are output terminals 56. The control tone output terminals 56 and the reference tone inputs 51 are related to the tape data tracks as indicated in the Table 1 below.

TABLE 1

| Circuit Terminal | Reference Tone | Tape Tracks | | | |
|---|---|---|---|---|---|
| 51 | (A) | 1 | 2 | 41 | 42 |
| 56*a* | | 3 | 4 | 39 | 40 |
| 56*b* | | 5 | 6 | 37 | 38 |
| 56*c* | | 7 | 8 | 35 | 36 |
| 56*d* | | 9 | 10 | 33 | 34 |
| 56*e* | | 11 | 12 | 31 | 32 |
| 56*f* | | 13 | 14 | 29 | 30 |
| 56*g* | | 15 | 16 | 27 | 28 |
| 56*h* | | 17 | 18 | 25 | 26 |
| 56*i* | | 19 | 20 | 23 | 24 |
| 52 | (B) | 21 | 22 | 21 | 22 |

Values for the resistors 55 are computed such that the voltage level at each output 56 varies vectorially and in proportion to the phase difference, hereinafter designated as $\theta$, between the reference tones A and B. The resistance computation must be based upon an assumption of the anticipated value of the angle $\theta$. An assumed value of 90° provides accurate results over a wide range of angular values. For values of $\theta$ other than 90° there is a residual error inherent in the resistive adding technique shown in FIG. 2; however, this error is small when compared to the non-linear portion of skew and the apparent phase shift resulting from noise on the track of interest.

Referring to Table 2 below, the relative phase angle at each output 56 between the two reference tones A and B is shown as a function of the overall skew phase angle $\theta$ between those reference tones.

TABLE 2

| Circuit Terminal | Reference Tone | Relative Phase Angle | Synthesis Formula for $\theta$=90° |
|---|---|---|---|
| 51 | (A) | 0 | A |
| 56*a* | | $0.1\theta$ | 0.99A + 0.16B |
| 56*b* | | $0.2\theta$ | 0.95A + 0.31B |
| 56*c* | | $0.3\theta$ | 0.89A + 0.45B |
| 56*d* | | $0.4\theta$ | 0.81A + 0.59B |
| 56*e* | | $0.5\theta$ | 0.71A + 0.71B |
| 56*f* | | $0.6\theta$ | 0.59A + 0.81B |
| 56*g* | | $0.7\theta$ | 0.45A + 0.89B |
| 56*h* | | $0.8\theta$ | 0.31A + 0.95B |
| 56*i* | | $0.9\theta$ | 0.16A + 0.99B |
| 52 | (B) | $\theta$ | B |

Figure 3:
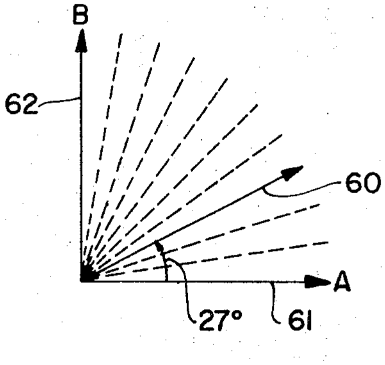
FIG. 3 is a diagram illustrating the phase relationship for a particular control tone, the example assuming an overall phase angle of 90° between reference tones.

Based upon an assumed $\theta$=90°, the synthesis formula of Table 2 above is computed by simple trigonometric relationships. For example, referring to FIG. 3, it becomes clear that the vector 60, indicative of the phase relationship of the control tone at output 56*c* for the fourth data track relative to the reference tones A 61 and B 62, may be represented by the equation A cos 27° + B sin 27°. By substituting the other values of the relative phase angle in the above equation and performing similar computations on the other data tracks one arrives at the synthesis formula shown in Table 2. It is to be understood that it is only the proportion of each resistor value to the circuit resistance value which is important, and that any number of resistance values could be used to obtain this proportion. In one particular working embodiment, the resistors of FIG. 2 were given the following values: resistors 55*a* and 55*n*, 180 ohms; resistors 55*b* and 55*m*, 200 ohms; resistors 55*c* and 55*d*, 68 ohms; resistors 55*d* and 55*k*, 133 ohms; and resistors 55*e*, 55*f*, 55*g*, 55*h*, 55*i* and 55*j*, 100 ohms. It is also to be understood that these values may be refined by more precise calculations if more accurate error corrections are needed for a particular application. It may be seen from the above description that the recorded reference tones must be held at the same relative amplitude; consequently, automatic gain control circuitry may be necessary on the inputs to the circuit at 51 and 52. Computations based on the assumption of $\theta$=90° provides good results for all actual phase angles from 0° to near 180°. The reference frequency must be selected only so that the phase difference between reference tones does not approach 180°.

Figure 4:
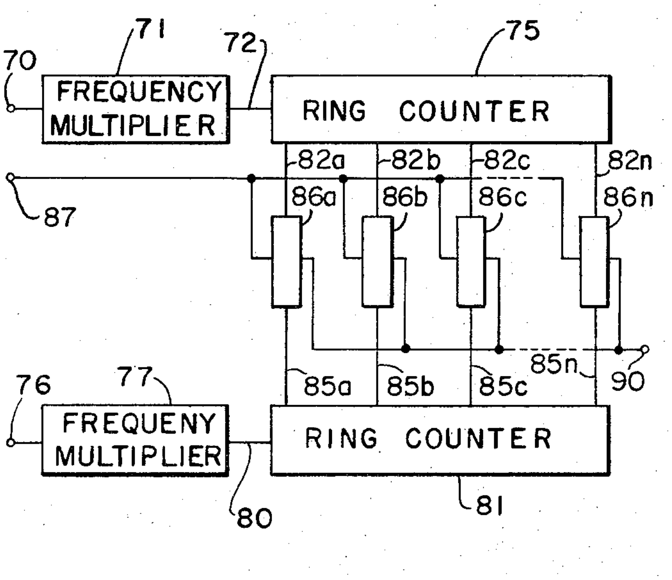
FIG. 4 is a block diagram for a time base error correction system suitable for use in conjunction with the present invention.

A time base error correction circuit suitable for use with control tones generated by the method of the present invention is shown in FIG. 4. A similar circuit is necessary for each data track to be corrected. Basically, the circuit operates by sampling and storing an input voltage waveform containing skew induced errors, with the sampling rate controlled by a tone simulated in the manner described hereinabove. The voltage waveform is subsequently dumped, or reconstructed, at a corrected rate derived from a highly stable external source which is also used to control the absolute tape speed. It is necessary that the frequency of the stable source applied at input 76 be identical to the long term average frequency of the synthesized control tone applied at input 70. One method of accomplishing this result would be to phase lock the tape movement servomechanism to one of the original reference tones recorded on tracks 1, 2, 21, 22, 41 and 42. For example, the tape movement servomechanism could be phase locked to the reference tone recorded on track 22. Referring again to FIG. 4, a control tone input 70 is connected to a frequency multiplier 71 which in turn is connected by line 72 to the step input of a ring counter 75. The reference source input 76 is connected to another frequency multiplier 77 which in turn is connected by line 80 to the step input of a second ring counter 81. Outputs 82 and 85 from corresponding stages of the ring counters 75 and 81 are connected to a series of sample and hold gates 86 in a manner which will be described in more detail below. Also connected to each of the sample and hold gates 86 is a data input 87 and a data output 90.

In operation, a simulated control tone for a data track to be corrected is applied to input 70, the input to the frequency multiplier 71. The output from the frequency multiplier 71, on line 72, is a pulse train whose frequency is some multiple, for example 40, times the instantaneous frequency of the control tone on input 70. A wide range of multiples could be used for the frequency multipliers with varying degrees of accuracy. A lower limit to the range of multiples is related to the data input frequency and is determined by the sampling theories of Nyquist, to be found in most modern textbooks on sampling theory. An upper limitation is that the time base correction capacity, which is equal to the number of sample and hold elements 86 multiplied by the period of the pulse train on line 80, must be greater than the worst case peak to peak absolute skew on the track being corrected.

Pulses on the line 72 cause the ring counter 75 to step such that a pulse appears sequentially at outputs 82*a*, 82*b*, 82*c* . . . 82*n*. Note that the stepping rate of the ring counter 75 varies with variations in the control tone on input 70 due to the introduction of time base errors. Simultaneously with the input of the control tone on input 70, the information to be corrected from the corresponding data track is applied to the circuit of FIG. 4 at input 87. As the enabling pulses 82*a*, 82*b*, 82*c* . . . 82*n* appear sequentially, the instantaneous data on the input line 87 is sequentially stored in gates 86*a*, 86*b*, 86*c* . . . 86*n*. In this manner, the skewed data waveform on input 87 is stored in the gates 86. To reconstruct the original, unskewed waveform, an external reference tone of the same frequency as those used to create the control tone on input 70 is applied to input 76, the input to a second frequency multiplier 77. The external reference tone would normally be from a crystal oscillator or some similar highly stable source. In like manner as described above, the frequency multiplier 77 provides a pulse train to line 80, the input to the ring counter 81, at a rate which is some multiple, for example 40, times the input rate of the reference on line 76. Both frequency multipliers 71 and 77 must provide the same rate of frequency multiplication for proper operation. Enabling pulses on lines 85 from the ring counter 81 are timed such that the pulse on line 85*a* appears after the pulse on line 82*a* has caused data to be stored in gate 86*a*, the pulse on line 85*b* appears after the pulse on line 82*b* has caused the data to be stored in gate 86*b*, and so on through the remaining gates 86. As the enabling pulse on line 85*a* is applied to the gate 86*a* the data previously stored within the gate is presented at the output 90. Similarly, the remaining enabling pulses on lines 85 cause the data stored in the remaining gates 86 to be sequentially presented at the output 90. When the error correction system is properly synchronized, the average delay between a given sample pulse on line 72 and the associated dump pulse on line 80 is one-half the cycle time of the ring counter 81. The process of first storing the data waveform with timing determined by the instantaneous skew error, and then recreating the waveform with corrected timing, results in a highly accurate reproduction of the original data waveform.

The above description is of a preferred embodiment of the invention and numerous modifications could be made thereto without departing from the spirit and scope of the invention which is limited only as defined in the appended claims. For example, it would be possible to simulate control tones for all data tracks on a tape by utilizing only one vector adder circuit and reference tones recorded only on the outermost tracks of the tape.

What is claimed is:

1. A method of generating a control tone for a data track located between an outermost track and a centrally disposed track of a multitrack magnetic recording tape, which comprises:

recording a first reference tone on said outermost track of said tape;

recording a second reference tone on said centrally disposed track of said tape;

vector adding said first and second reference tones through a resistor circuit, and sampling said resistor circuit whereby the resultant tone has a phase angle proportional to the relative phase angle between said first and second reference tones as the distance from the data track to the said outermost track is proportional to the distance between said outermost and centrally disposed tracks.

2. A process according to claim 1 wherein sampling includes assuming a relative phase difference of 90° between reference tones.

3. A process according to claim 2 wherein said reference tones are held at the same relative amplitude.

4. A process according to claim 3 wherein said reference tones have some frequency A cos $\omega t$.

* * * * *